United States Patent
Watanabe et al.

(10) Patent No.: US 7,260,319 B2
(45) Date of Patent: Aug. 21, 2007

(54) ABNORMALITY MONITORING DEVICE FOR MOTOR CONTROL SYSTEM

(75) Inventors: Hiroto Watanabe, Iwata (JP); Mikiyasu Uchiyama, Iwata (JP); Tomoaki Kishi, Iwata (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 66 days.

(21) Appl. No.: 11/190,051

(22) Filed: Jul. 25, 2005

(65) Prior Publication Data
US 2006/0018636 A1  Jan. 26, 2006

(30) Foreign Application Priority Data
Jul. 23, 2004  (JP)  ............................. 2004-216136

(51) Int. Cl.
*H02P 7/06* (2006.01)
(52) U.S. Cl. ................. 388/804; 388/800; 388/811; 388/819; 388/829; 318/138; 318/254; 318/439; 318/599
(58) Field of Classification Search ........... 318/138, 318/254, 599, 430–434, 720–724, 801; 361/23–34; 388/800–830
See application file for complete search history.

(56) References Cited

U.S. PATENT DOCUMENTS

| | | | | |
|---|---|---|---|---|
| 4,275,342 A | * | 6/1981 | Kawada et al. ............. | 318/490 |
| 5,345,532 A | * | 9/1994 | Fukushima .................. | 388/813 |
| 5,363,406 A | * | 11/1994 | Han ............................. | 375/238 |
| 5,587,633 A | * | 12/1996 | Aoki et al. .................. | 318/164 |
| 6,153,993 A | * | 11/2000 | Oomura et al. ............. | 318/434 |
| 6,396,225 B1 | * | 5/2002 | Wakui et al. ................ | 318/254 |
| 6,906,492 B2 | * | 6/2005 | Matsushita .................. | 318/727 |
| 7,102,306 B2 | * | 9/2006 | Hamaoka et al. ........... | 318/254 |

FOREIGN PATENT DOCUMENTS

| | | |
|---|---|---|
| JP | 06-307274 | 11/1994 |
| JP | 2006-42446 | * 2/2006 |

* cited by examiner

*Primary Examiner*—Lincoln Donovan
*Assistant Examiner*—Tyrone Smith
(74) *Attorney, Agent, or Firm*—Knobbe, Martens, Olson & Bear LLP

(57) ABSTRACT

An abnormality monitoring device monitors a PWM driving signal output from a driving section of an associated motor control system to judge whether the driving section is operating abnormally. By monitoring the output of the driving section, the monitoring device can detect an abnormality of the driving section before the motor can respond to the abnormal drive signal to a significant degree (e.g., to a degree readily discernable to a rider of a motorcycle on which the motor control system is employed in combination with an electronic throttle system).

16 Claims, 11 Drawing Sheets

ABNORMALITY MONITORING DEVICE FOR MOTOR CONTROL SYSTEM

CROSS-REFERENCE TO RELATED APPLICATIONS

This application is based upon and claims priority under 35 U.S.C. § 119(a)-(d) to Japanese Patent Application No.2004-216136, filed Jul. 23, 2004, the entire contents of which is hereby incorporated by reference.

BACKGROUND OF THE INVENTION

1. Field of the Invention

The present invention relates to an abnormality monitoring device for a motor control system and, more particularly, to an abnormality monitoring device for monitoring an abnormality of a motor control system on a vehicle.

2. Description of the Related Art

Prior engines have employed abnormality monitoring devices with electronically-controlled throttle valves to detect for malfunction. An example of such is disclosed in Japanese Patent Application Laid-Open No. 06-307274 in which an abnormality monitoring device is employed with an electronic throttle system that includes a driving means to open the throttle valve and an associated controller. The monitoring device is used to determine whether the controller is functioning abnormally by monitoring for situations where at least a preset difference is generated between an actual throttle valve opening (actual driving state) of the driving means and a throttle valve opening (predicted driving state) predicted from a depressed amount of an accelerator (e.g., a pedal). If the abnormality monitoring device detects such a situation, the controller stops the driving means.

However, in the above-described conventional abnormality monitoring device described in Japanese Patent Application Laid-Open No. 06-307274, it is judged that the control means is abnormal in a case where the certain or more difference is generated between the actual throttle valve opening (actual driving state) and the predicted throttle valve opening (predicted driving state). Therefore, when the judging of the abnormality is delayed, the throttle motor abnormally operates to abnormally operate the throttle valve by the abnormality of the control means, and there is a possibility that an abnormal behavior is generated in a vehicle.

SUMMARY OF THE INVENTION

An aspect of the present invention involves the recognition that in prior engines, the abnormality monitoring device detects the abnormal operating condition after it has occurred. Thus, for example, in a motor control system for use in the electronic throttle system or the like mounted on a vehicle (e.g., a motorbike), unless it is quickly determined when the control system or electronic throttle system is operating abnormally, the engine will run abnormally before the monitoring device makes its determination and the control system can take action. Therefore, in the motor control system mounted on the vehicle, it is preferred to determine that the motor control system is functioning abnormally before the engine responds to the abnormal operation.

Another aspect of the present invention is to provide an abnormality monitoring device for a motor control system, which solves the above-noted problem. The abnormality monitoring device monitors a driving signal output from a driving section of a controller to determine whether the driving section is functioning correctly so that an abnormalities in the output driving signal from the driving section can be detected before the engine abnormally operates to any significant degree (e.g., to a degree discernable by a rider of a motorcycle on which the motor control system is employed along with an electronic throttle system).

In accordance with an additional aspect of the present invention, there is provided an abnormality monitoring device for a motor control system comprising a control section that generates a PWM control signal to PWM-control a motor, and a driving section that generates a PWM driving signal to drive the motor, which driving signal is based on the PWM control signal. A counting section counts pulse periods of the PWM driving signal output from the driving section, and an abnormality judging section of the device determines whether the driving section is properly functioning based on the PWM control signal and a counting result provided by the counting section.

In this manner, in the output end of the driving section for driving the motor (e.g., the throttle motor), the pulse of the PWM driving signal output from the driving section is monitored to judge whether the driving section is functioning abnormally, thus allowing the operational abnormality of the driving section to be detected before the engine operates abnormally to any significant degree.

Another aspect of the present invention involves an abnormality monitoring device for the motor control system that comprises a control section. The control section generates a PWM control signal to control a motor using pulse width modulation. A driving section of the system generates a PWM driving signal based on the PWM control signal to drive the motor. An edge detecting section detects a rising (or falling) edge of each pulse of the PWM driving signal output from the driving section, and a counting section counts an edge period of the rising (or falling) edge of each pulse detected by the edge detecting section. A monitoring time setting section sets a monitoring time to monitor the edge period based on the PWM control signal. An edge period comparing section compares the edge period counted by the counting section with the monitoring time set by the monitoring time setting section. The comparison result of the comparing section is used by an abnormality judging section to judge whether or not the driving section is operating abnormally.

An additional aspect of the present invention involves an abnormality monitoring device for the motor control system. The control system comprises a control section which generates a PWM control signal to control a motor and a driving section which generates a PWM driving signal based on the PWM control signal to drive the motor. The monitoring device comprises an edge detecting section which detects a rising (or falling) edge of each pulse of the PWM driving signal output from the driving section, and a counting section that counts an edge period of the rising (or falling) edge of each pulse detected by the edge detecting section. A monitoring time setting section sets a monitoring time to monitor the edge period based on the PWM control signal, and an edge period comparing section compares the edge period counted by the counting section with the monitoring time set by the monitoring time setting section. The monitoring device also comprises a duty detecting section that detects a duty value of the PWM driving signal based on the edge period counted by the counting section, and a duty comparing section that compares the duty value detected by the duty detecting section with a target duty value set in accordance with the PWM control signal. An abnormality judging section judges whether or not the driving section is operating abnormally based on comparison results of the edge period comparing section and the duty comparing section. By detecting both the rising (or falling) edge of each pulse of the PWM driving signal as well as the duty value, and the abnormality of the driving section can be accurately judged.

In a preferred mode, the control section sets a control range of the target duty value to be greater than 0% and be less than 100%, and the abnormality judging section judges that driving section is abnormal when the rising (or falling) edge is not detected by the edge detecting section and the comparison result that the counting result of the counting section exceeds the monitoring time is input thereto from the edge period comparing section.

According to this construction, when the control range of the target duty value is greater than 0% and is less than 100%, it is possible to detect the rising (or falling) edge of each pulse of the PWM driving signal and the duty value. Consequently, it can be accurately judged that the driving section is abnormal, and the abnormal operation of the motor can be almost immediately stopped.

In a further preferred mode, the abnormality judging section, prior to start of the PWM control of the motor by the control section, judges whether operations of the edge period comparing section, the edge detecting section, the monitoring time setting section, and the counting section are normal or abnormal.

In accordance with a further aspect of the present invention a motor control system with an abnormality monitoring program is provided. The system comprises a control section that generates a PWM control signal to control a motor, and a driving section that generates a PWM driving signal based on the PWM control signal to drive the motor. The program includes an edge detecting step of detecting a rising (or falling) edge of each pulse of the PWM driving signal, a counting step of counting an edge period of the rising (or falling) edge of each detected pulse, a monitoring time setting step of setting a monitoring time to monitor the edge period based on the PWM control signal, a comparing step of comparing the counted edge period with the set monitoring time, and an abnormality judging step of judging an abnormality of the driving section based on the comparison result.

In a preferred mode of the program, the rising (or falling) edge of each pulse of the PWM driving signal output from the driving section is detected to judge whether or not the driving section is abnormal. Therefore, there can be provided a program which detects the abnormality of the driving section to almost instantly stop the operation of the motor before the motor abnormally operates to a significant degree.

An additional aspect of the present invention involves an abnormality monitoring program for the motor control system. The motor control comprises a control section that generates a PWM control signal to PWM-control a motor, and a driving section which generates a PWM driving signal based on the PWM control signal to drive the motor. The program involves an edge detecting step of detecting a rising (or falling) edge of each pulse of the PWM driving signal; a counting step of counting an edge period of the rising (or falling) edge of each detected pulse; a monitoring time setting step of setting a monitoring time to monitor the edge period based on the PWM control signal; a first comparing step of comparing the counted edge period with the set monitoring time; a duty detecting step of detecting a duty value of each pulse based on the counted edge period and detection of the falling edge; a second comparing step of comparing the detected duty value with a target duty value set in accordance with the PWM control signal; and an abnormality judging step of judging whether or not the driving section is abnormal based on comparison results of the first and second comparing steps.

According to this program, the rising (or falling) edge of each pulse of the PWM driving signal output from the driving section and the duty value are detected to judge whether or not the driving section is abnormal. Therefore, there can be provided a program which detects the abnormality of the driving section to stop the operation of the motor before the motor abnormally operates to a significant degree.

BRIEF DESCRIPTION OF THE DRAWINGS

The above mentioned and other features of the invention disclosed herein are described below with reference to the drawings of the preferred embodiments. The illustrated embodiments are intended to illustrate, but not to limit, the inventions disclosed herein. The drawings contain the following Figures.

DETAILED DESCRIPTION OF THE PREFERRED EMBODIMENTS

As noted above, an aspect of the present invention involves a motor control system for use with an engine. The control system is configured to monitor a pulse of a PWM driving signal output from a driving section of the system to determine whether or not the driving signal is abnormal so as to detect the abnormality of the driving section before the engine abnormally operates. Accordingly, the present control system is well adapted for use on vehicles (e.g., motorbikes, watercraft, ATVs, automobile, etc.), and the following embodiment of the control system is disclosed in this context; however, the present control system can be used with engines used in other applications (e.g., stationary engines such as, for example, those used with generators). Additionally, the present control system can be used with motors apart from internal combustion engines.

The application of the present control system, with an abnormality monitoring device, to a motorbike will be described in reference to FIGS. 1 to 7, which are explanatory views of the motorbike to which the present control system can be applied. The general construction of the motorbike will first be described, with reference to FIG. 1, before the description of the control system and its operation. However, the illustrated motorbike is merely an example of the type of vehicle on which the present control system can be used.

Figure 1:
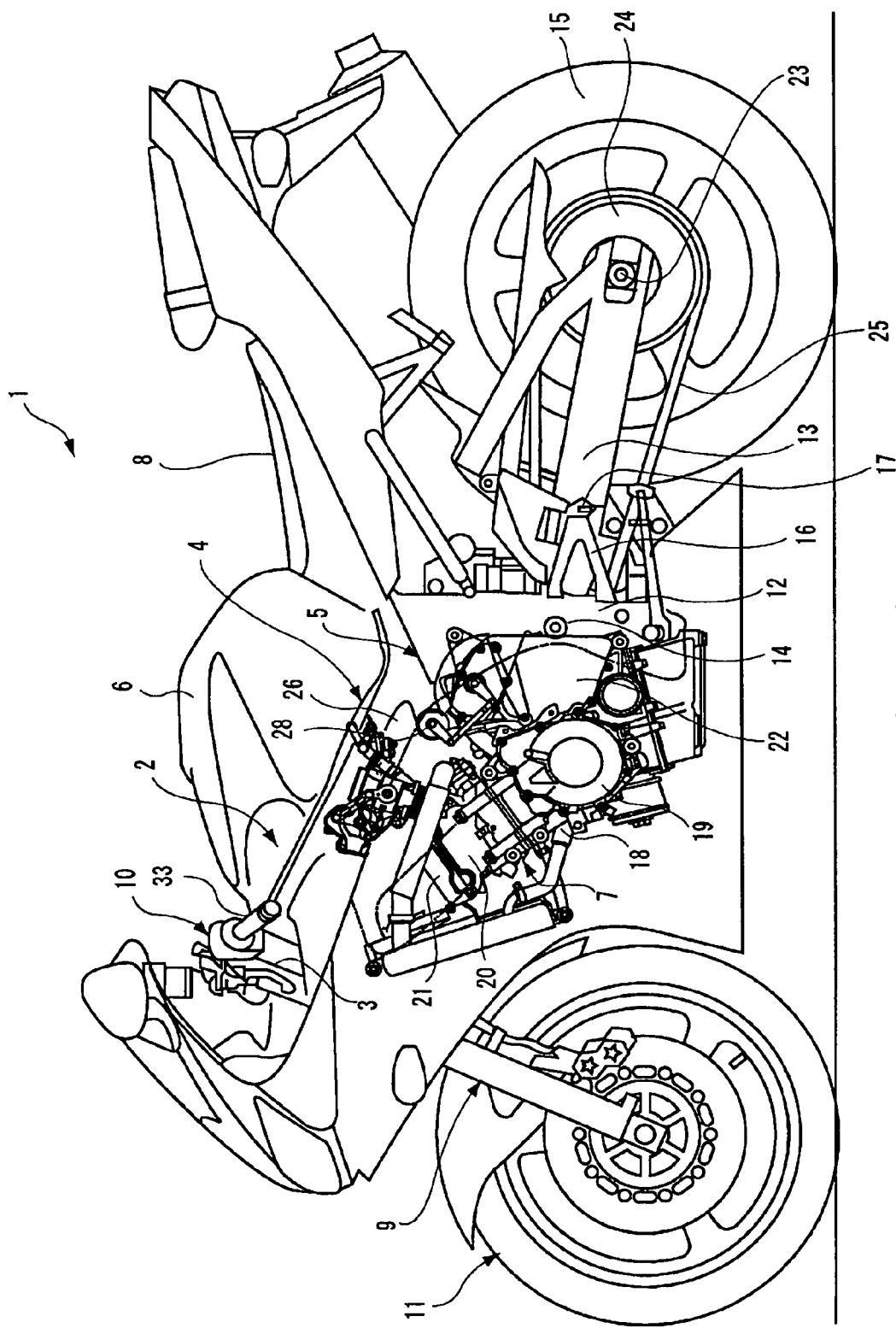
FIG. 1 is a left-side elevational view of an exemplary motorbike including an engine and an associated control system with an abnormality monitoring device, which are configured in accordance with a preferred embodiment of the present invention.

With reference to FIG. 1, the motorbike 1 includes a vehicle body frame 2 that is connected to a head pipe 3. A rear frame 5 extends obliquely rearward relative to the head pipe 3 and is connected to rear ends of a pair of right and left tank rails 4. A fuel tank 6 is disposed above the tank rails 4, and an engine unit 7 is disposed under the rails 4. A main seat 8 is disposed in a front part of the rear frame 5. The head pipe 3 pivotally supports a front fork 9. A steering handle 10 is connected to an upper end of the front fork 9 and a front wheel 11 is connected to a lower end of the fork 9. A rear swing arm 13 is pivotally supported via a pivot shaft 14 on a rear arm bracket 12 disposed under the rear ends of the tank rails 4, and a rear wheel 15 is provided on a rear end of the rear arm 13. The rear arm bracket 12 is provided with a step bracket 16 protruding rearwards, and the step bracket 16 is provided with a step 17 on which a rider steps is disposed.

Figure 2:
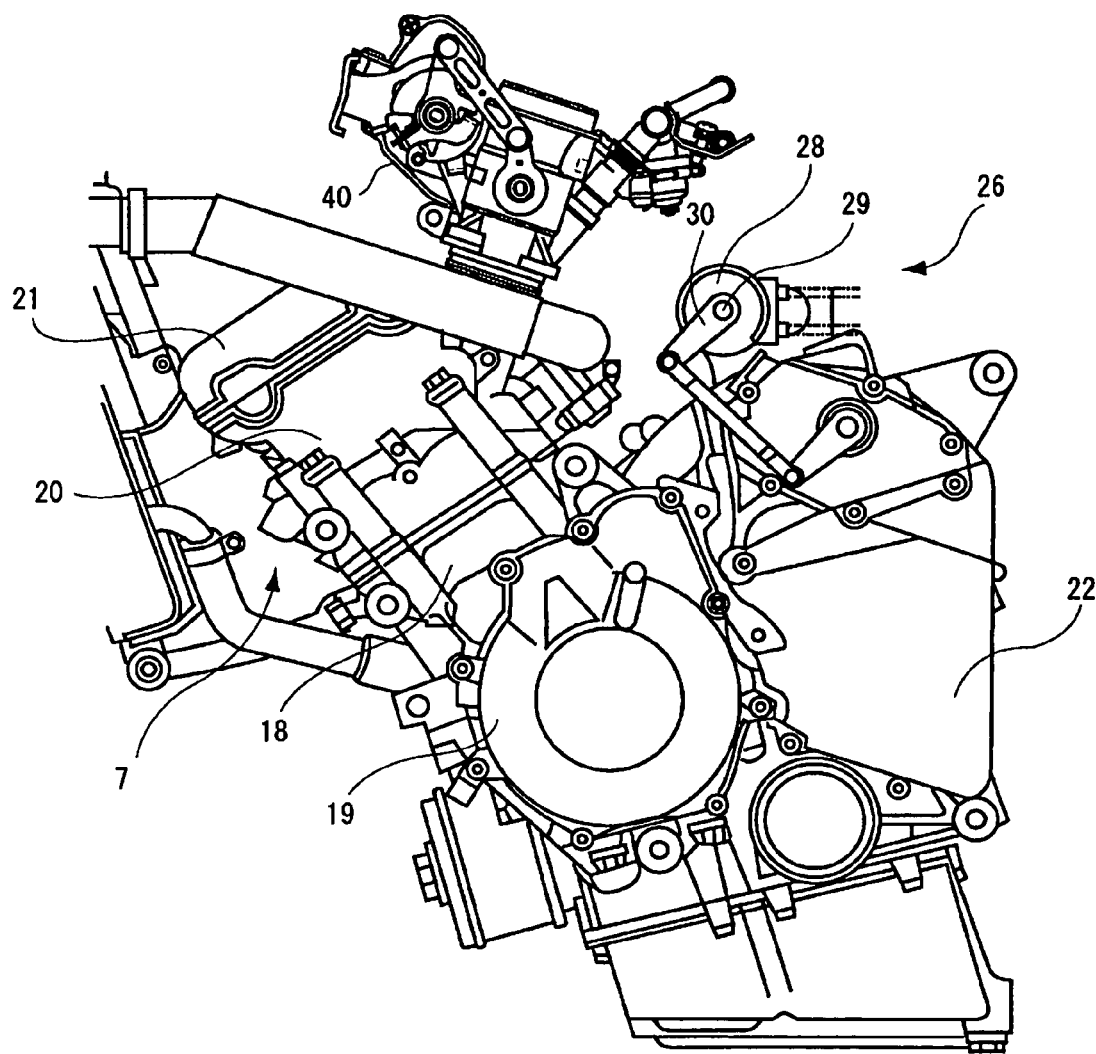
FIG. 2 is an enlarged left-side elevational view of the engine of FIG. 1.
Figure 3:
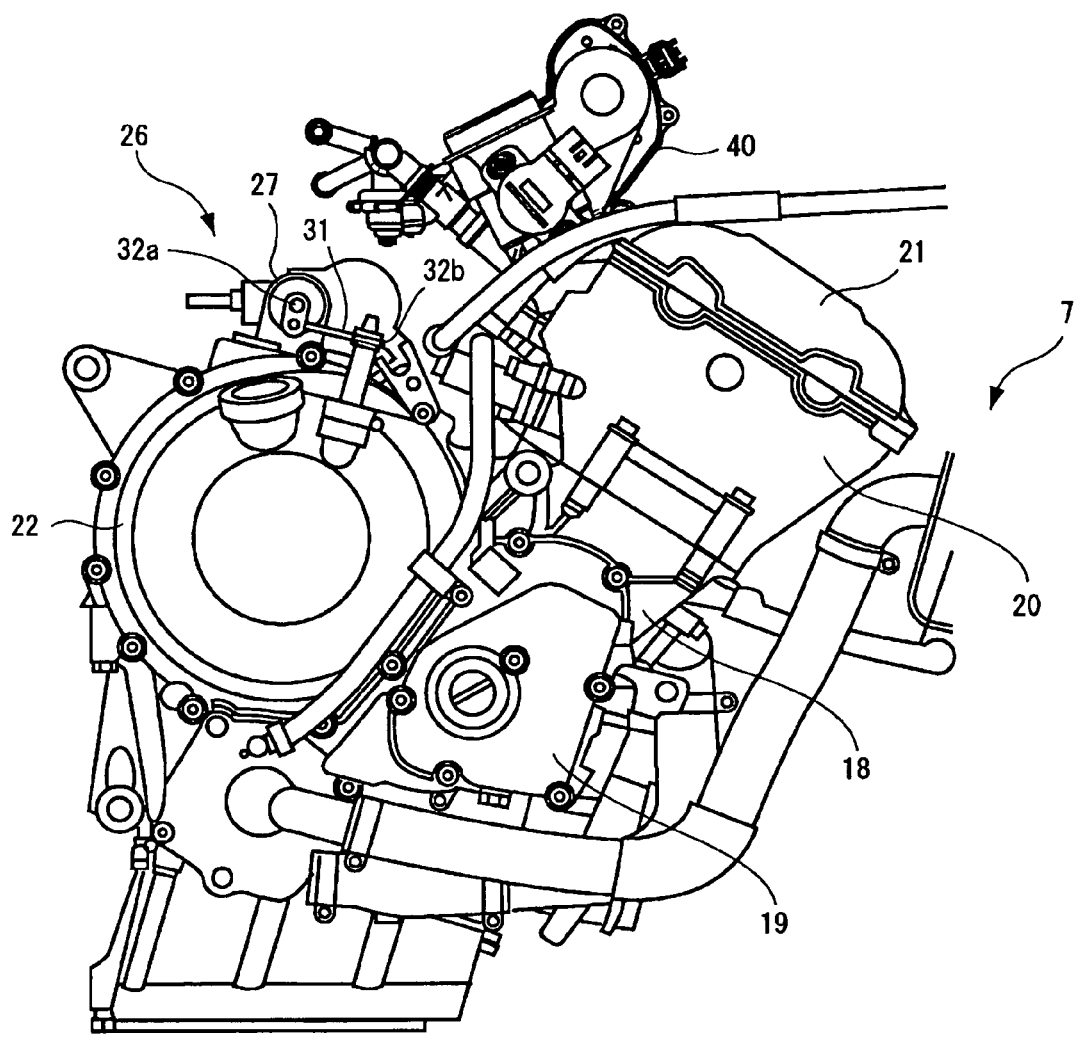
FIG. 3 is an enlarged right-side elevational view of the engine of FIG. 1.

With reference now to FIGS. 1-3, the engine unit 7 functions as a water-cooled, 4-cycle, parallel 4-cylinder power source; however, the present control system can be used with engines having other numbers of cylinders (i.e., one or more), having other cylinder-configurations (e.g., V, W or opposing), having other constructions (e.g., air cooled), and operating on other combustion principles. In the illustrated embodiment, a cylinder shaft of a cylinder block 18 is tilted slightly toward a front part of the vehicle body. A crankcase 19 is positioned under the cylinder block 18 to house a crankshaft and is disposed transversely (i.e., directed in the vehicle-width direction). The crankcase is suspended and supported in the vehicle body frame 2. On the upper end of the cylinder block 18, a cylinder head 20 and a head cover 21 are stacked and are connected onto an upper surface of the cylinder block 18.

Behind the cylinder block 18, a transmission case 22 (hereinafter referred to as the transmission) is integrally formed to house a multiple shift mechanism comprising a main shaft and a driving shaft of a transmission device arranged generally in parallel with the crankshaft, and a plurality of stages of transmission gears. The transmission 22 is provided with a clutch (not shown) to engage and disengage the main and driving shafts together through the various transmission gears. The crankcase 19 preferably is connected to lower surfaces of the cylinder block 18 and to the transmission 22.

A shaft portion 23 for connecting the rear wheel 15 to the rear end of the rear arm 13 is provided with a driven sprocket 24, and a chain 25 is wound between the driven sprocket 24 and a driving sprocket (not shown) fixed to the driving shaft of the engine unit 7. Accordingly, engine power is transmitted to the rear wheel 15 via the chain 25. Of course, other types of transmitters can also be used.

An automated transmission (AMT) mechanism 26 preferably is disposed behind the cylinder block 18 and above the transmission 22. This AMT mechanism 26 automatically operates the clutch or switches the transmission gear of the transmission 22, and includes an electric motor 27 (see FIG. 3) for operating the clutch, and another components required in AMT.

As shown in FIG. 2, a shift driving mechanism 28 is positioned in an upper part of the transmission 22 on a left side (as viewed from a position on the motorbike 1) and operates the multiple shift mechanism in the transmission 22 by a link mechanism. The link mechanism comprises a rod 29 and a lever 30.

Moreover, as shown in FIG. 3, the electric motor 27 for the clutch is positioned in the upper part of the transmission 22 on a right side of the motorbike 1. The electric motor 27 forms part of a clutch mechanism that also comprises a rod 31 and levers 32a, 32b. When the electric motor 27 for the clutch rotates, the lever 32a pivots in a vertical direction in the figure, the rod 31 moves in a longitudinal direction in the figure by the pivot of the lever 32a, and the lever 32b rocks in a cross direction in the figure by the movement of the rod 31 to disengage or engage the clutch in the transmission 22. The electric motor 27 for the clutch, the rod 31, and the levers 32a, 32b function as a driving source. Reference numeral 40 in FIGS. 2 and 3 denotes a throttle mechanism, the description of which will be described later.

As seen in FIG. 1, for example, a shift switch (not shown) is disposed on a grip side of a left handle 33. When the rider manually operates the shift switch, a shift position of the transmission gear is changed from a neutral to a first or top gear in an increasing or decreasing direction. An AMT switch (not shown) is also disposed on the grip side of the left handle 33 to switch a gear shift operation to a semi-automatic or full automatic mode. The multiple shift mechanism and the switching of the clutch are both driven by a wire or a hydraulic mechanism (not shown) by use of the AMT mechanism 26.

The throttle mechanism 40 will be described with reference to FIG. 4. The throttle mechanism 40 communicates with an induction port of each cylinder in the engine unit 7.

Figure 4:
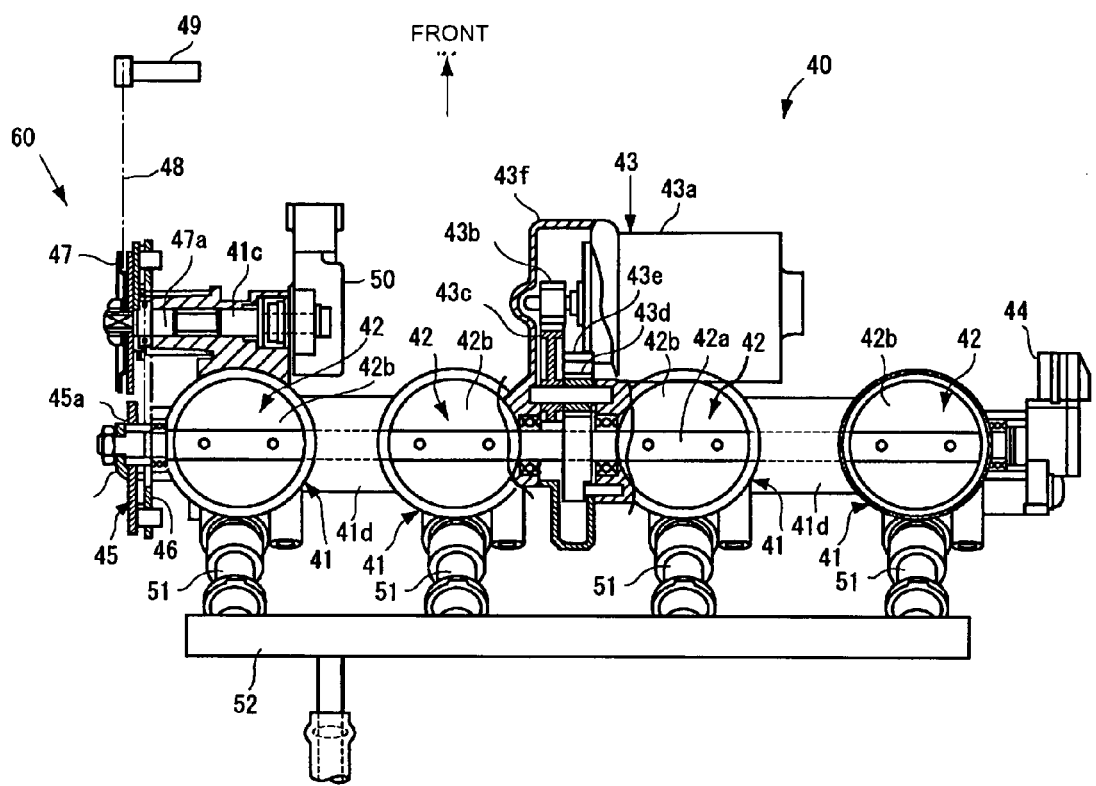
FIG. 4 is a diagram illustrating a throttle valve mechanism of the engine of FIG. 1.

As seen in FIG. 4, each throttle body 41 preferably has a cylindrical shape, and each throttle valve 42 is formed by fixing a disc-shaped valve plate 42b disposed in each throttle body 41 to a common valve shaft 42a disposed in such a manner as to pass through all of the throttle bodies 41. The throttle bodies 41, 41 on right and left sides of FIG. 4 are connected to each other via connecting boss portions 41d, 41d, and an electromotive driving mechanism 43 is preferably disposed between the middle throttle bodies 41, 41. The electromotive driving mechanism 43, however, can be disposed at other locations on the engine relative to the throttle bodies.

In the electromotive driving mechanism 43, an electric motor 43a preferably is disposed in such a manner that a rotation shaft of the motor extends in parallel with the valve shaft 42*a*. Rotation of a driving gear 43*b* attached to the rotation shaft of the electric motor 43*a* is transmitted to a fan-shaped valve shaft driving gear 43*e* fixed to the valve shaft 42*a* via a large intermediate gear 43*c* and a small intermediate gear 43*d*. The valve shaft 42*a* is rotated and driven by the valve shaft driving gear 43*e*. This electromotive driving mechanism 43 is housed in a case 43*f* formed separately from the throttle body 41. It is to be noted that the electric motor 43*a* preferably is a DC motor.

As seen in FIG. 4, a throttle valve opening sensor 44 for detecting an opening of the throttle valve 42 is attached to an end portion (e.g., to a right end portion) of the valve shaft 42*a*, which protrudes outwards. A disc-shaped boss portion 45*a* of a free arm 45 is attached to a left end portion, and an arm portion 45*b* (not shown) of the free arm 45 is connected to an intermediate pulley 47 via a link plate 46. This intermediate pulley 47 is connected to a throttle grip 49 of the steering handle 10 via a throttle cable 48.

The link plate 46, the intermediate pulley 47, the throttle cable 48, and the throttle grip 49 constitute a throttle operating mechanism 60 for manually opening/closing the throttle valve 42 in accordance with a rider's manipulation (i.e., operation) of the throttle grip 49.

The intermediate pulley 47 is fixed to and supported onto a left end of an intermediate shaft 47*a* in such a manner that the pulley rotates together with the shaft, and this intermediate shaft 47*a* is rotatably supported by a boss portion 41*c* provided in the left-end throttle body 41. A right end of the intermediate shaft 47*a* is connected to a throttle grip opening sensor 50, which detects an operation angle of the throttle grip 49.

At least one fuel injection valve 51 preferably is disposed under each throttle body 41 for each cylinder, and a common fuel supply rail 52 is connected to a fuel introducing portion of each fuel injection valve 51.

Figure 5:
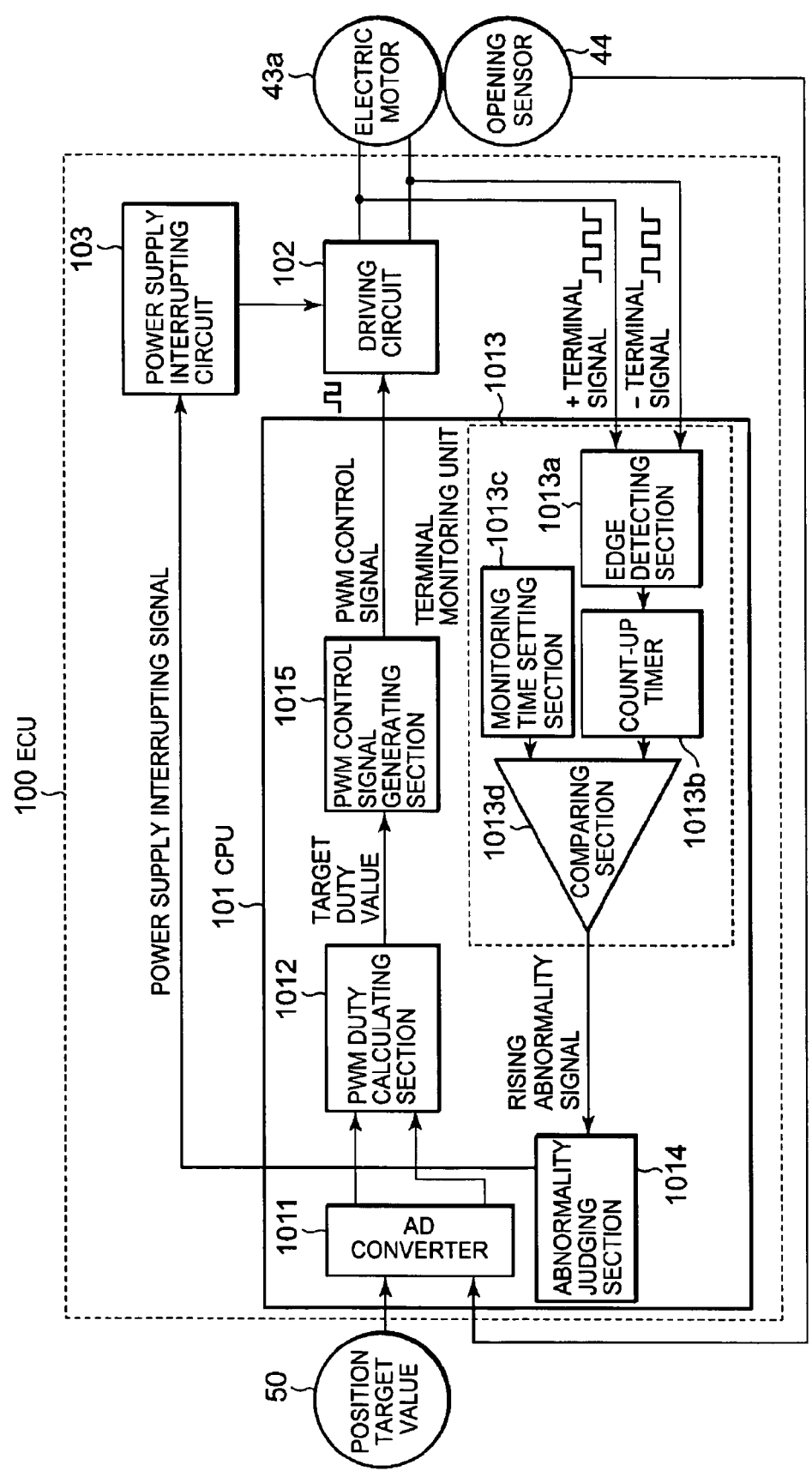
FIG. 5 is a block diagram illustrating the control system of the motorbike of FIG. 1.

With reference now to FIG. 5, an ECU 100 of the motorbike 1 will be described with reference to the illustrated block diagram. The engine control unit (ECU) 100 comprises a CPU 101, a driving circuit 102, and a power supply interrupting circuit 103. While the ECU 100 may control several components of the engine, the following will described the portion of the ECU 100 whose control object is to operate the electric motor 43*a* of the electromotive driving mechanism 43 of the throttle mechanism 40. The ECU's structure and operations as it relates to other engine systems (e.g., the fuel injection system, the ignition system, etc.) can be conventional and well known to those skilled in the art.

The central processing unit (CPU) 101 is provided with an AD converter 1011, a pulse width modulation (PWM) duty calculating section 1012, a terminal monitoring unit 1013, an abnormality judging section 1014, and a PWM control signal generating section 1015. Furthermore, the terminal monitoring unit 1013 is provided with an edge detecting section 1013*a*, a count-up timer 1013*b*, a monitoring time setting section 1013*c*, and a comparing section 1013*d*.

The AD converter 1011 converts into digital values a position target value (analog signal) input from the throttle grip opening sensor 50 in accordance with the operated amount of the throttle grip 49 and a throttle opening (analog signal) input from the throttle valve opening sensor 44. The AD converter 1011 outputs the digital values to the PWM duty calculating section 1012.

The PWM duty calculating section 1012 calculates a difference between the position target value and the throttle opening based on the respective digital values of the position target value and the throttle opening input from the AD converter 1011, and the section calculates a target duty value for operating the electric motor 43*a* to a position corresponding to the difference to output the value to the PWM control signal generating section 1015. The PWM control signal generating unit section 1015 generates a PWM control signal based on the target duty value input from the PWM duty calculating section 1012 to output the signal to the driving circuit 102. It is to be noted that a setting range of the target duty value is 0% to 100%. In the illustrated embodiment, the PWM duty calculating section 1012 functions as a control section.

The edge detecting section 1013*a* detects rising edges of pulses of + and − terminal signals of PWM driving signals output from the positive and negative output terminals (+)(−) of the driving circuit 102, and outputs an edge detection signal to the count-up timer 1013*b*.

The count-up timer 1013*b* starts counting-up at a power supply turn-on time of the ECU 100 or a motor driving start time by the driving circuit 102. When the edge detection signal is input from the edge detecting section 1013*a*, a counted value is reset, and thereafter the timer resumes the counting-up. The count-up timer 1013*b* outputs the counted value to one input terminal of the comparing section 1013*d*. In the illustrated embodiment, the count-up timer 1013*b* functions as a counting section of the motor control system.

The monitoring time setting section 1013*c* sets a monitoring time of the rising edge detected by the edge detecting section 1013*a* based on the PWM control signal generated by the PWM control signal generating section 1015. The monitoring time is set to be not less than (e.g., twice that of) a PWM period set in accordance with the PWM control signal. In many applications, the PWM period is a predefined period. The monitoring time setting section 1013*c* outputs the monitoring time set value (which is can be a constant value) to the other input terminal of the comparing section 1013*d*. It is to be noted that the monitoring time setting section 1013*c* sets the monitoring time in accordance with the PWM period in a case where the target duty value calculated by the PWM duty calculating section 1012 is greater than 0% and is less than 100%.

The comparing section 1013*d* compares the counted value input from the count-up timer 1013*b* with the monitoring time set value input from the monitoring time setting section 1013*c*. The section does not output any rising abnormality signal in a case where the counted value does not exceed the monitoring time set value, and judges that there is not any signal ("low" signal). When the counted value exceeds the monitoring time set value, the section outputs the rising abnormality signal ("high" signal) to the abnormality judging section 1014. That is, the comparing section 1013*d* outputs the "high" signal as the rising abnormality signal to the abnormality judging section 1014, when the rising edge of the pulse for the monitoring time is not detected by the edge detecting section 1013*a* and the counted value exceeds the monitoring time set value, in the case where the target duty value calculated by the PWM duty calculating section 1012 is greater than 0% and is less than 100%. In this embodiment, the comparing section 1013*d* functions as an edge period comparing section.

Moreover, in the case where the target duty values are 0% and 100%, when any pulse rising edge is not detected by the edge detecting section 1013*a* within the monitoring time and the counted value exceeds the monitoring time set value, the comparing section 1013*d* outputs the rising abnormality signal, but the abnormality judging section 1014 judges that the driving circuit is normal. That is, when the target duty values are 0% and 100%, the PWM driving signal output from the driving circuit 102 remains to be the "low" or "high" signal, and any rising edge is not detected by the edge detecting section 1013*a*. Therefore, the count-up timer 1013*b* continues counting up, and the counted value exceeds the monitoring time set value. Therefore, in the present embodiment, when the target duty values are 0% and 100%, the abnormality judging section 1014 judges that the counted value exceeding the monitoring time set value is normal. When the rising edge is detected and the counted value does not exceed the monitoring time set value, the abnormality judging section 1014 judges that the driving circuit is abnormal.

When the rising abnormality signal is input from the comparing section 1013*d*, the abnormality judging section 1014 judges that the driving circuit 102 is abnormal, and outputs a power supply interrupting signal to the power supply interrupting circuit 103. In the case where the target duty value set by the target duty calculating section 1012 is greater than 0% and is less than 100%, when the pulse rising edge is not detected within the monitoring time by the edge detecting section 1013*a* and the rising abnormality signal ("high" signal) is input from the comparing section 1013*d*, the abnormality judging section 1014 judges that the driving circuit 102 is abnormal, and outputs the power supply interrupting signal to the power supply interrupting circuit 103. However, in the case where the target duty values are 0% and 100%, when any pulse rising edge is not detected by the edge detecting section 1013*a* within the monitoring time and the rising abnormality signal ("high" signal) is input from the comparing section 1013*d*, the abnormality judging section 1014 judges that the driving circuit 102 is normal. But, when the rising edge of the pulse is detected by the edge detecting section 1013*a* within the monitoring time and the rising abnormality signal ("high" signal) is not input from the comparing section 1013*d*, the abnormality judging section judges that the driving circuit 102 is abnormal, and outputs the power supply interrupting signal to the power supply interrupting circuit 103.

The driving circuit 102 generates the PWM driving signal based on the PWM control signal input from the PWM control signal generating section 1015 to drive the electric motor 43*a*. When the power supply interrupting signal is input from the abnormality judging section 1014, the power supply interrupting circuit 103 interrupts the power to be supplied to the driving circuit 102 to stop the operation of the driving circuit 102.

A further description of the operation of the ECU 100 will be described with reference to a flowchart shown in FIG. 6 and a timing chart shown in FIG. 7 in a case where the target duty value is greater than 0% and is less than 100%.

Figure 6:
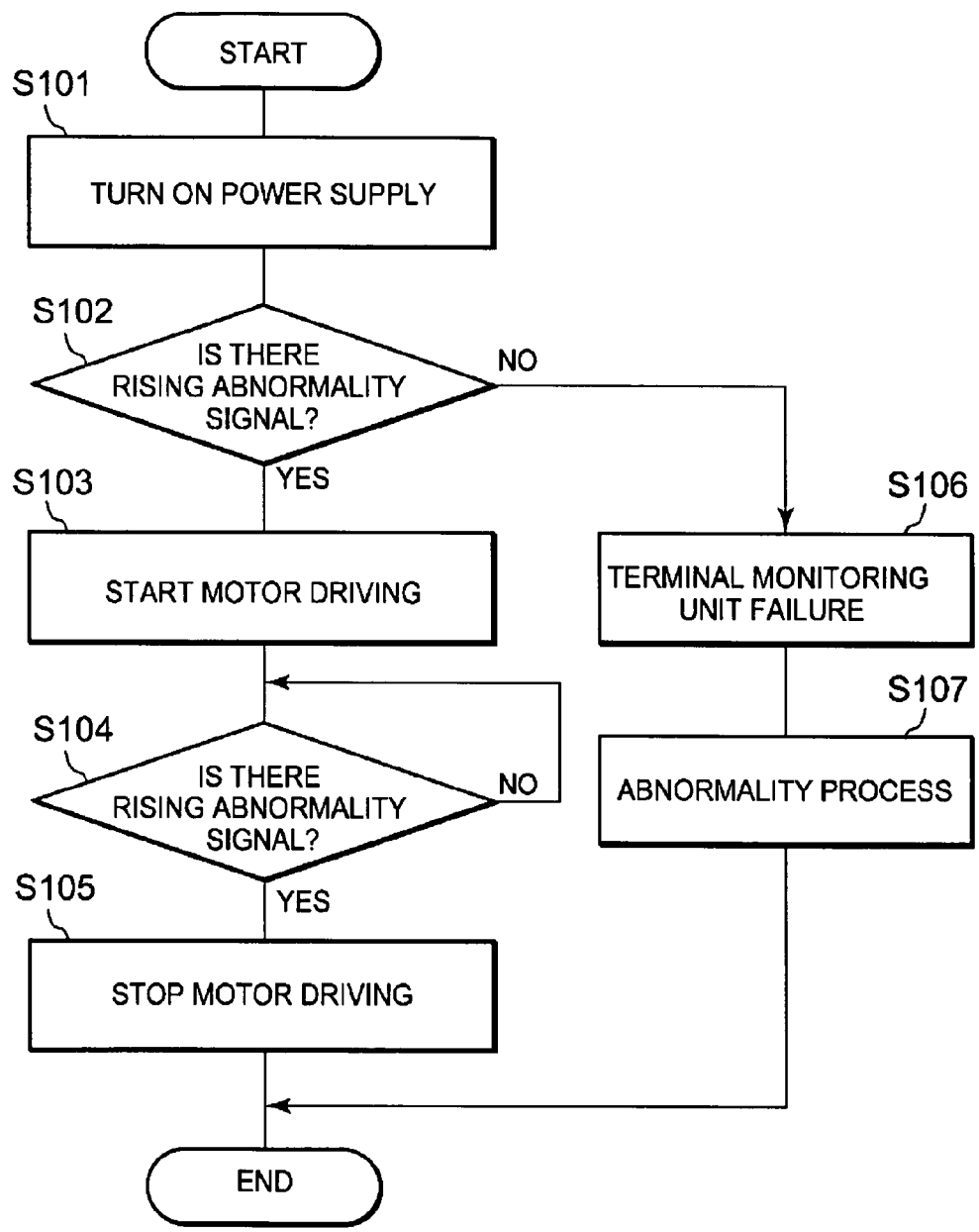
FIG. 6 is a flowchart showing an operation of the abnormality monitoring device illustrated in FIG. 5.

In FIG. 6, when a power supply of the ECU 100 is turned on (step S101), the abnormality judging section 1014 judges whether or not the rising abnormality signal is input from the comparing section 1013*d* (step S102). Operations of the terminal monitoring unit 1013 and the abnormality judging section 1014 will be described at this power supply turn-on time with reference to FIG. 7.

Figure 7:
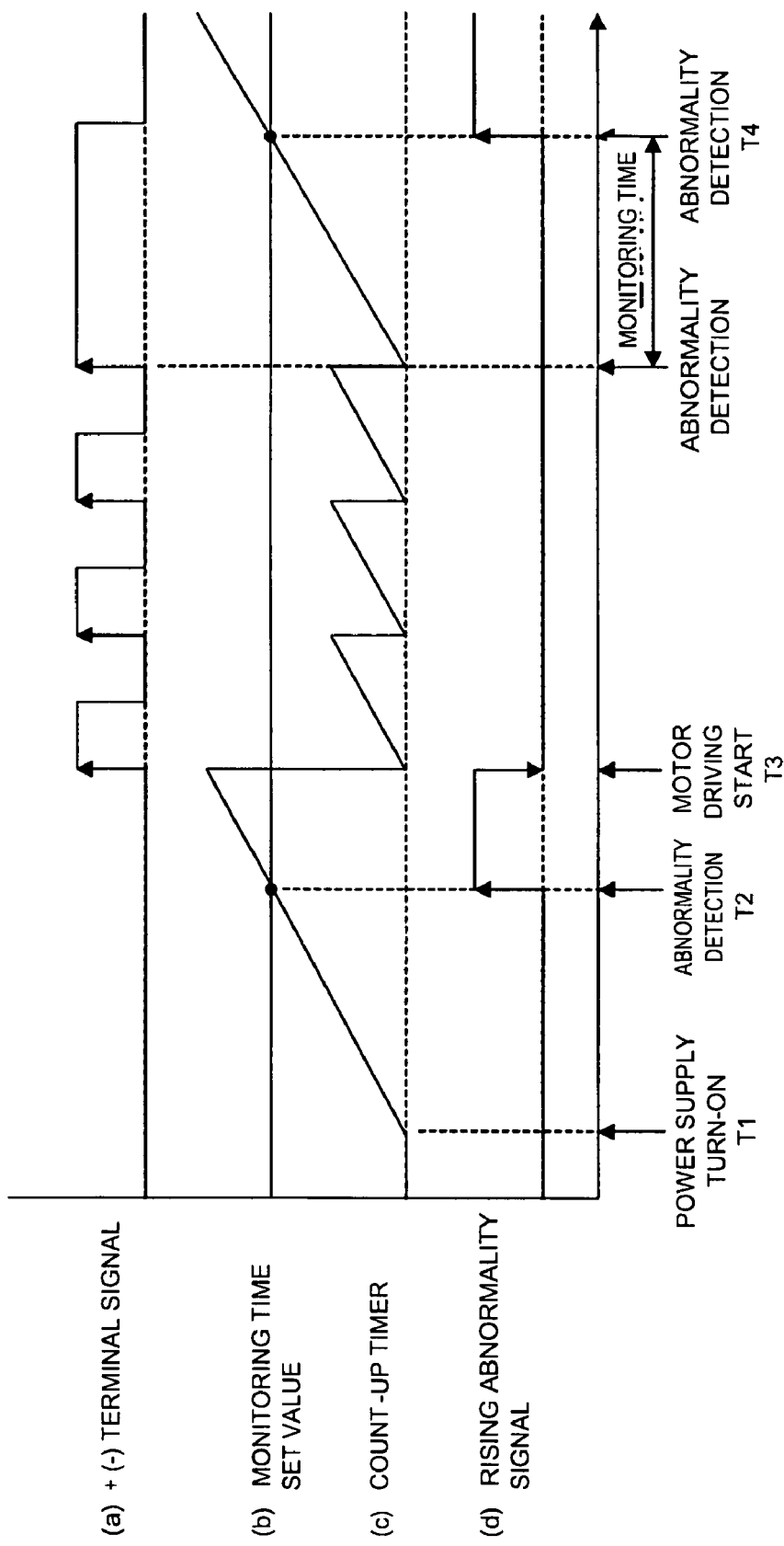
FIG. 7 depicts timing charges in which chart (a) is a timing chart showing a PWM driving signal of a +(−) terminal, chart (b) is a timing chart showing a monitoring time set value, chart (c) is a timing chart showing a counted value of a count-up timer, and chart (d) is a timing chart showing a rising abnormality signal.

In FIG. 7, chart (a) is a timing chart showing an operation of the above-described +(−) terminal signal, chart (b) is a timing chart showing an operation of the monitoring time set value, chart (c) is a timing chart showing an operation of the counted value of the count-up timer 1013*b*, and chart (d) is a timing chart showing an operation of the rising abnormality signal.

As shown in FIG. 7, in a timing T1 of power supply turn-on, the count-up timer 1013*b* starts counting up. At this time, it is assumed that any control is not started with respect to the electric motor 43*a*, and an initial monitoring time set value is set in the monitoring time setting section 1013*c*. Since the control with respect to the electric motor 43*a* is not started, the count-up timer 1013*b* continues counting up, and the counted value exceeds the monitoring time set value. Moreover, when the counted value exceeds the monitoring time set value, as shown in the chart (d), the comparing section 1013*d* outputs the rising abnormality signal ("high" signal) at a timing T2 of abnormality detection.

Therefore, immediately after the power supply is turned on, the PWM driving signal for driving the motor is not output from the driving circuit 102. Therefore, the abnormality judging section 1014 judges whether or not the rising abnormality signal ("high" signal) is output from the comparing section 1013*d* to judge whether the respective operations are normal or abnormal in the edge detecting section 1013*a*, count-up timer 1013*b*, monitoring time setting section 1013*c*, and comparing section 1013*d* of the terminal monitoring unit 1013.

In step S102, when the rising abnormality signal ("high" signal) is input from the comparing section 1013*d*, the abnormality judging section 1014 judges that the operation of each section in the terminal monitoring unit 1013 is normal (step S102: YES), and the process shifts to step S103 to start driving the motor. When any rising abnormality signal ("high" signal) is not input from the comparing section 1013*d*, the abnormality judging section 1014 judges that the operation of each section of the terminal monitoring unit 1013 is abnormal (step S102: NO), and the process shifts to step S106 to execute a terminal monitoring unit failure process. Next, an abnormality process is executed in step S107.

Next, in FIG. 7, after the rising abnormality signal at the above-described abnormality detection time (T2) reaches a "high" level, the abnormality judging section 1014 judges that the operation of the terminal monitoring unit 1013 is normal. As soon as the driving of the motor is started (T3), the rising abnormality signal is reset to a "low" signal. After the motor driving start T3, the PWM duty calculating section 1012 calculates a difference between the position target value and the throttle opening based on the respective digital values of the position target value and the throttle opening input from the AD converter 1011, and the section calculates the target duty value corresponding to the difference. The PWM control signal is generated based on the target duty value in the PWM control signal generating section 1015, and is output to the driving circuit 102. In the driving circuit 102, the +(−) terminal signal (PWM driving signal) shown in the chart (a) is generated based on the PWM control signal input from the PWM control signal generating section 1015, and is output to the electric motor 43*a*.

Moreover, when the motor driving is started, in the terminal monitoring unit 1013, the edge detecting section 1013*a* detects the rising edges of the respective pulses of the + and − terminal signals output from output terminals (+)(−) of the driving circuit 102. As shown in charts (a) and (b) of FIG. 7, when the rising edge of each pulse is detected by the edge detecting section 1013*a*, the counted value of the count-up timer 1013*b* is reset. At this time, since the counted value is reset to be less than the monitoring time set value, any rising abnormality signal is not output from the comparing section 1013*d*.

Next, in step S104 of FIG. 6, the abnormality judging section 1014 monitors whether or not the rising abnormality signal ("high" signal) is input from the comparing section 1013*d*. Unless the rising abnormality signal ("high" signal)

is input from the comparing section 1013d (step S104: NO), the present process is repeated.

Moreover, when the rising abnormality signal ("high" signal) is input from the comparing section 1013d (step S104: YES), the abnormality judging section 1014 judges that the driving circuit 102 is abnormal, and shifts to step S105. The abnormality judging section outputs the power supply interrupting signal to the power supply interrupting circuit 103, and allows the power supply interrupting circuit 103 to stop the operation of the driving circuit 102.

That is, when, as shown in FIG. 7(a), abnormalities are generated in the + and − terminal signals, and a "high" state of each pulse continues, the count-up timer 1013b of the chart (c) continues counting up. When the counted value exceeds the monitoring time set value shown in chart (d), the comparing section 1013d outputs the rising abnormality signal ("high" signal) to the abnormality judging section 1014 (abnormality detection T4 in the figure).

The abnormality judging section 1014 judges that the driving circuit 102 is abnormal in accordance with the rising abnormality signal ("high" signal) input from the comparing section 1013d, and the power supply interrupting signal is output to the power supply interrupting circuit 103. In response to the power supply interrupting signal input from the abnormality judging section 1014, the power supply interrupting circuit 103 inhibits the power from being supplied to the driving circuit 102. As a result, the PWM driving signal output from the driving circuit 102 is stopped, and the driving of the electric motor 43a is stopped.

As described above, in the motorbike 1 of the present embodiment, the CPU 101 is provided with the terminal monitoring unit 1013 which monitors the PWM driving signal output from the driving circuit 102 for driving the electric motor 43a, and the abnormality judging section 1014 which judges whether or not the driving circuit 102 is abnormal. In the terminal monitoring unit 1013, the edge detecting section 1013a detects the rising edge of each pulse of the PWM driving signal, the count-up timer 1013b counts an edge detection period, and the comparing section 1013d compares the monitoring time set value (e.g., twice the PWM signal period) set by the monitoring time setting section 1013c based on the PWM control signal with the counted value of the count-up timer 1013b. Moreover, when the counted value exceeds the monitoring time set value, the comparing section 1013d outputs the rising abnormality signal ("high" signal) to the abnormality judging section 1014. When the rising abnormality signal ("high" signal) is input from the comparing section 1013d, the abnormality judging section 1014 judges that the driving circuit 102 is abnormal, outputs the power supply interrupting signal to the power supply interrupting circuit 103, interrupts the power supply for the driving circuit 102, and stops the operation of the electric motor 43a.

Therefore, the abnormality of the driving circuit 102 can be judged quickly, the abnormality of the driving circuit 102 is judged before the electric motor 43a abnormally operates, and the operation of the electric motor 43a can be stopped almost instantly. As a result, an abnormal behavior can be prevented from being generated in the motorbike by an abnormal operation of the electric motor 43a, and the operation of the motorbike can be enhanced.

It is to be noted that while the detection of the rising edge of the pulse has been described above in the present embodiment, a falling edge of the pulse can alternatively or additionally be detected.

Moreover, the operation of the ECU 100 has been described above with reference to FIGS. 6 and 7 in the case where the target duty value is greater than 0% and is less than 100%, but the terminal monitoring unit 1013 and the abnormality judging section 1014 have functions of detecting and judging the abnormality of the driving circuit 102 even in the case where the target duty value is 0% or 100%.

Therefore, the abnormality of the driving circuit 102 can be judged quickly even in the case where the target duty value is 0% or 100%. Prior to the abnormal operation performed by the electric motor 43a, it can be judged that the driving circuit 102 is abnormal, and the operation of the electric motor 43a can be stopped almost immediately.

The abnormality judging section 1014 also has a function of judging whether the operation of each section in the terminal monitoring unit 1013 is normal or abnormal before the PWM control of the motor is started by the PWM duty calculating section 1012.

Therefore, after the operation of the terminal monitoring unit 1013 is confirmed prior to the start of the PWM control of the motor, the PWM control can be started, and reliability of the ECU can be enhanced further.

FIGS. 8-11 illustrate a motor control system configured in accordance with another embodiment of the present invention. In the following description, like components among the described embodiments are referenced using the same reference numerals and the above-description of such components should be understood as applying equally to the embodiment illustrated in FIGS. 8-11. In this embodiment, in addition to the judgment of the abnormality by the edge detection of the above-described embodiment, the abnormality is judged by duty detection.

Figure 8:
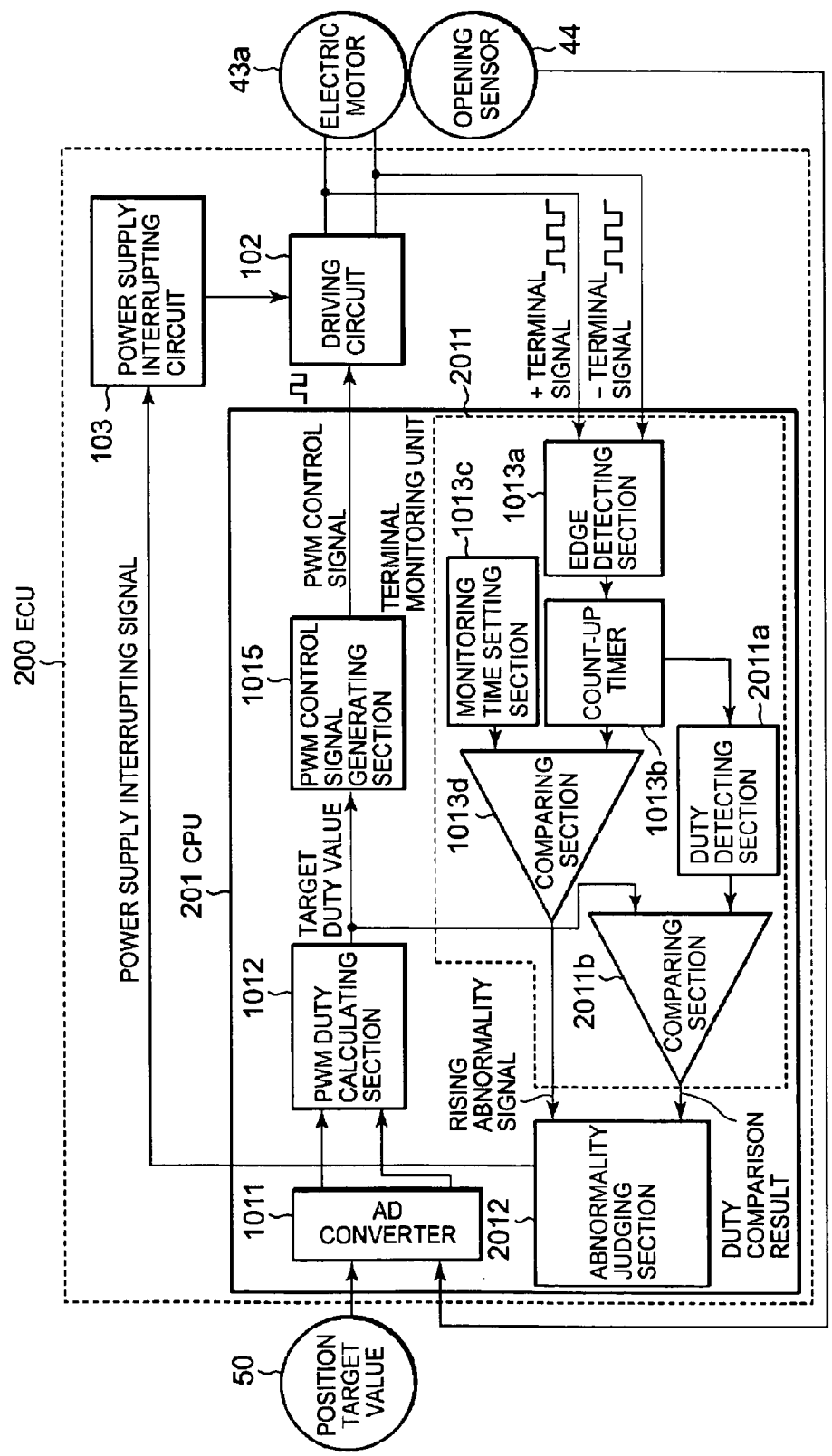
FIG. 8 is a block diagram illustrating a control system of a motorbike in accordance with another embodiment of the present invention.

FIG. 8 is a block diagram of at least a portion an ECU 200. In FIG. 8, a terminal monitoring unit 2011 is provided with an edge detecting section 1013a, a count-up timer 1013b, a monitoring time setting section 1013c, a comparing section 1013d, a duty detecting section 2011a, and a comparing section 2011b.

The duty detecting section 2011a detects a duty value of a PWM driving signal based on a counted value input from the count-up timer 1013b, and outputs the duty value to the comparing section 2011b.

The comparing section 2011b compares a target duty value input from a PWM duty calculating section 1012 with the duty value input from the duty detecting section 2011a, and outputs a duty comparison result to an abnormality judging section 2012. The comparing section 2011b functions as a duty comparing section.

The abnormality judging section 2012 judges that a driving circuit 102 is abnormal based on a rising abnormality signal input from the comparing section 1013d, and the duty comparison result input from the comparing section 2011b, and outputs a power supply interrupting signal to a power supply interrupting circuit 103.

Next, an operation of the ECU 200 will be described with reference to a flowchart shown in FIG. 9 and a timing chart shown in FIG. 10 in a case where the target duty value is greater than 0% and is less than 100%.

Figure 9:
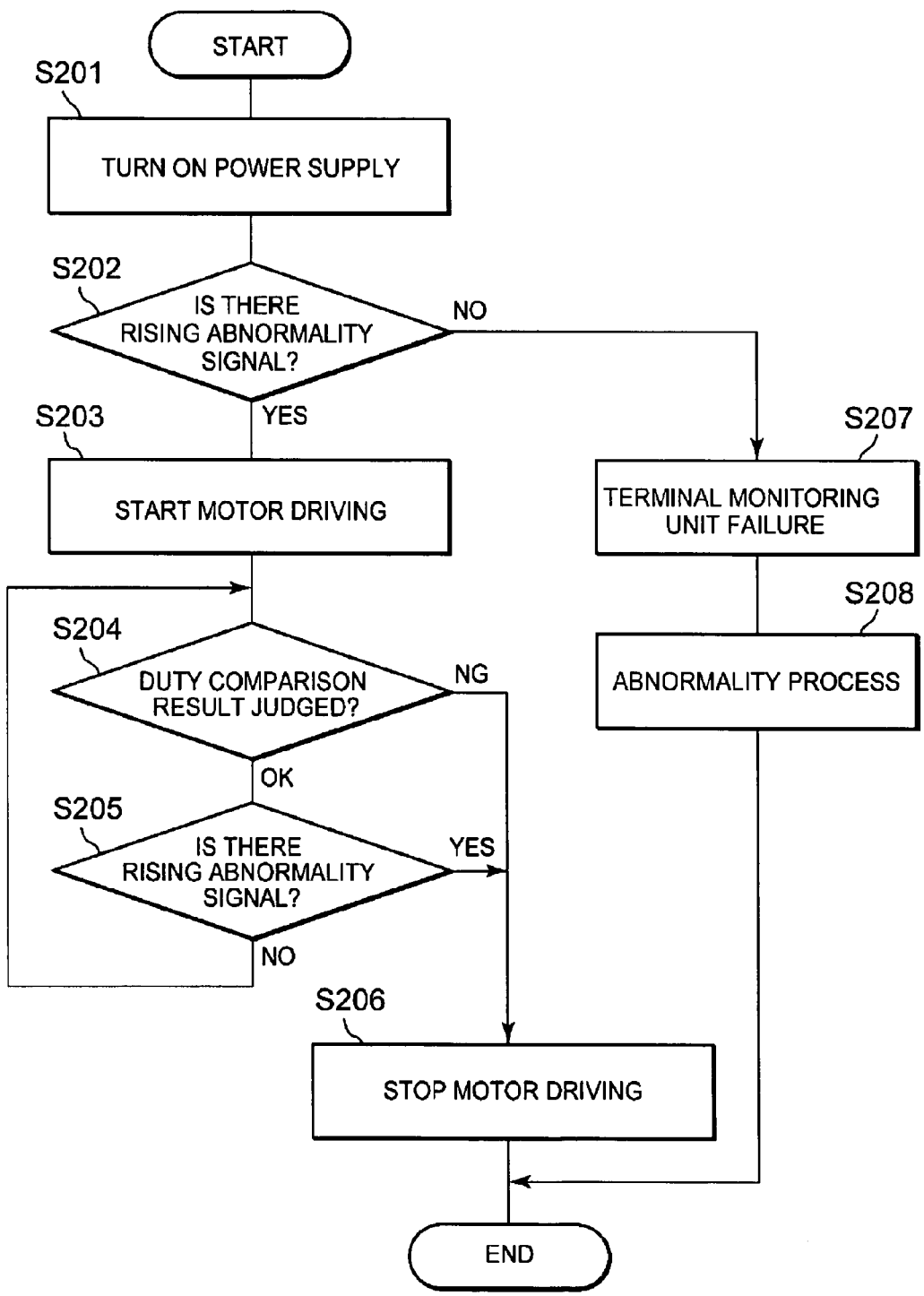
FIG. 9 is a flowchart showing an operation of an abnormality monitoring device of the control system illustrated in FIG. 8.

In FIG. 9, when a power supply of the ECU 200 is turned on (step S201), the abnormality judging section 2012 judges whether or not the rising abnormality signal is input from the comparing section 1013d (step S202). Operations of the terminal monitoring unit 2011 and the abnormality judging section 2012 will be described at this power supply turn-on time with reference to FIG. 10.

Figure 10:
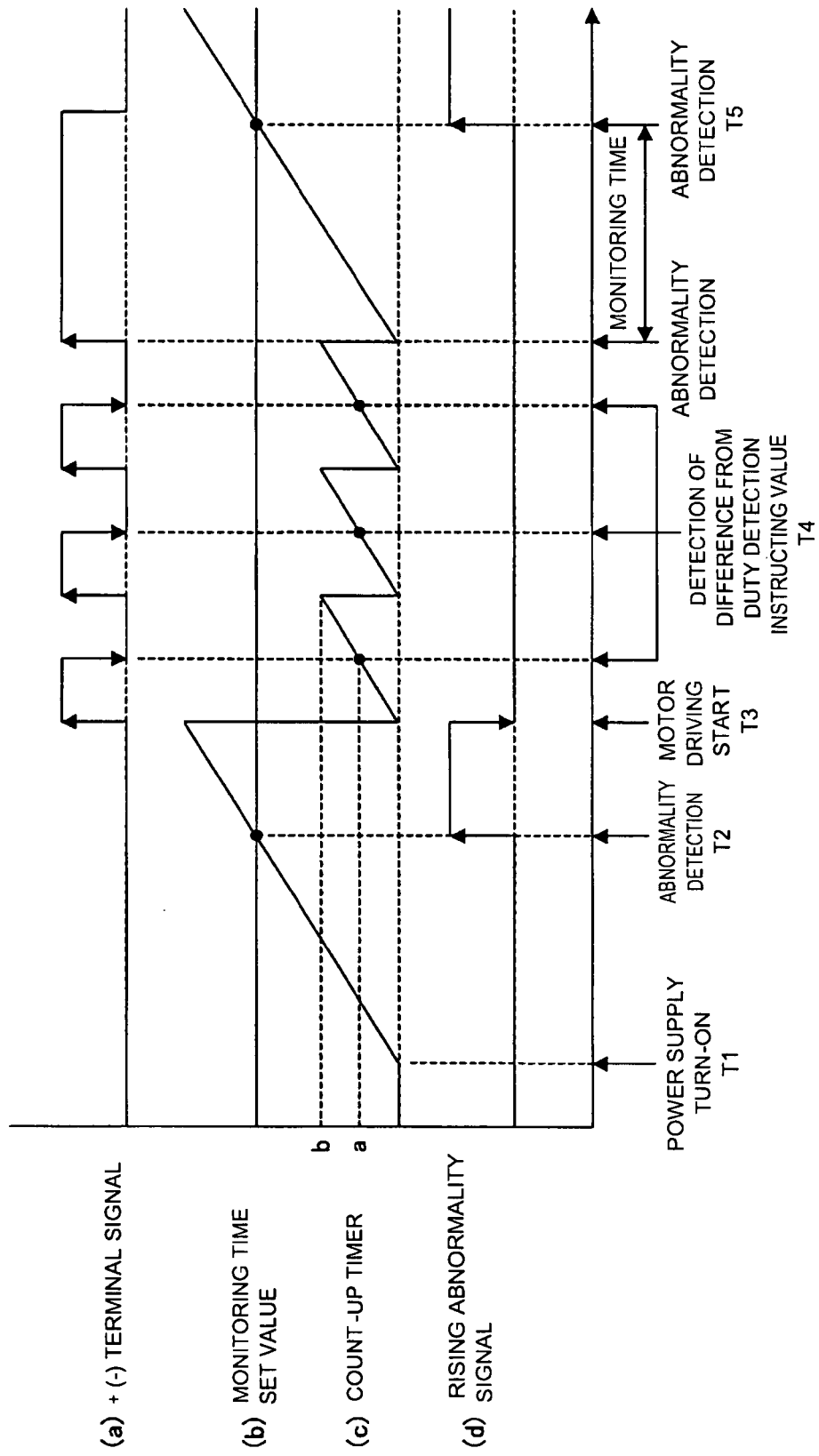
FIG. 10 depicts timing charts in which chart (a) is a timing chart showing the PWM driving signal of the +(−) terminal, chart (b) is a timing chart showing the monitoring time set value, chart (c) is a timing chart showing the counted value of the count-up timer, and chart (d) is a timing chart showing the rising abnormality signal.

In FIG. 10, chart (a) is a timing chart showing an operation of a +(−) terminal signal, chart (b) is a timing chart showing an operation of a monitoring time set value, chart (c) is a timing chart showing an operation of the counted value of the count-up timer 1013*b*, and chart (d) is a timing chart showing an operation of the rising abnormality signal.

As shown in FIG. 10, in a timing T1 of power supply turn-on, the count-up timer 1013*b* starts counting up. At this time, it is assumed that any control is not started with respect to an electric motor 43*a*, and an initial monitoring time set value is set in the monitoring time setting section 1013*c*. Since the control with respect to the electric motor 43*a* is not started, the count-up timer 1013*b* continues counting up, and the counted value exceeds the monitoring time set value. Moreover, when the counted value exceeds the monitoring time set value, as shown in the chart (d), the comparing section 1013*d* outputs the rising abnormality signal ("high" signal) at a timing T2 of abnormality detection.

Therefore, immediately after the power supply is turned on, a PWM driving signal for driving the motor is not output from the driving circuit 102. Therefore, the abnormality judging section 2012 judges whether or not the rising abnormality signal ("high" signal) is output from the comparing section 1013*d* to judge whether the respective operations are normal or abnormal in the edge detecting section 1013*a*, count-up timer 1013*b*, monitoring time setting section 1013*c*, and comparing section 1013*d* of the terminal monitoring unit 2011.

In step S202, when the rising abnormality signal ("high" signal) is input from the comparing section 1013*d*, the abnormality judging section 2012 judges that the operation of each section in the terminal monitoring unit 2011 is normal (step S202: YES), and the process shifts to step S203 to start driving the motor. When any rising abnormality signal ("high" signal) is not input from the comparing section 1013*d*, the abnormality judging section 2012 judges that the operation of each section of the terminal monitoring unit 2011 is abnormal (step S202: NO), and the process shifts to step S207 to execute a terminal monitoring unit failure process. Next, an abnormality process is executed in step S208.

Next, in FIG. 10, after the rising abnormality signal at the above-described abnormality detection time (T2) reaches a "high" level, the abnormality judging section 2012 judges that the operation of the terminal monitoring unit 2011 is normal. As soon as the driving of the motor is started (T3), the rising abnormality signal is reset to a "low" level. After the motor driving start T3, the PWM duty calculating section 1012 calculates a difference between a position target value and a throttle opening based on digital values of the position target value and the throttle opening input from an AD converter 1011, and the section calculates the target duty value corresponding to the difference. A PWM control signal is generated based on the target duty value, and is output to the driving circuit 102. In the driving circuit 102, the +(−) terminal signal (PWM driving signal) shown in chart (a) is generated based on the PWM control signal input from a PWM control signal generating section 1015, and is output to the electric motor 43*a*.

Moreover, when the motor driving is started, in the terminal monitoring unit 2011, the edge detecting section 1013*a* detects rising edges of pulses of + and − terminal signals output from output terminals (+)(−) of the driving circuit 102. As shown in charts (a) and (b) of FIG. 10, when the rising edge of each pulse is detected by the edge detecting section 1013*a*, the counted value of the count-up timer 1013*b* is reset. At this time, since the counted value is reset to be less than the monitoring time set value, any rising abnormality signal is not output from the comparing section 1013*d*.

Moreover, in the duty detecting section 2011*a*, as shown in chart (c) of FIG. 10, the duty value of the PWM driving signal is detected as a value a with respect to a value b (edge period) of the counted value input from the count-up timer 1013*b*, and the duty value is output to the comparing section 2011*b*. Next, in the comparing section 2011*b*, the target duty value input from the PWM duty calculating section 1012 is compared with the duty value input from the duty detecting section 2011*a*, a difference is detected (T4 in the figure), and the difference is output to the abnormality judging section 2012.

Next, in step S204 of FIG. 9, the abnormality judging section 2012 judges whether the operation of the driving circuit 102 is normal or abnormal based on the difference which is the duty comparison result input from the comparing section 2011*b*. In this case, for example, it is judged that the driving circuit 102 is abnormal in a case where the difference as the duty comparison result is not less than a certain value.

When the abnormality judging section 2012 judges in step S204 that the driving circuit 102 is normal in accordance with the difference as the duty comparison result (step S204: OK), the process shifts to step S205.

Next, in step S205, the abnormality judging section 2012 monitors whether or not the rising abnormality signal ("high" signal) is input from the comparing section 1013*d*. When any rising abnormality signal ("high" signal) is not input from the comparing section 1013*d* (step S205: NO), the abnormality judging section returns to the step S204, and repeats the process.

Moreover, when the rising abnormality signal ("high" signal) is input from the comparing section 1013*d* (step S205: YES), the abnormality judging section 2012 judges that the driving circuit 102 is abnormal, shifts to step S206, outputs the power supply interrupting signal to the power supply interrupting circuit 103, and allows the power supply interrupting circuit 103 to stop the operation of the driving circuit 102.

That is, when, as shown in FIG. 10(*a*), abnormalities are generated in the + and − terminal signals, and a "high" state of each pulse continues, the count-up timer 1013*b* of the chart (c) continues counting up. When the counted value exceeds the monitoring time set value shown in the chart (b), the comparing section 1013*d* outputs the rising abnormality signal ("high" signal) to the abnormality judging section 2012 (abnormality detection T5 in the figure).

The abnormality judging section 2012 judges that the driving circuit 102 is abnormal in accordance with the rising abnormality signal ("high" signal) input from the comparing section 1013*d*, and the power supply interrupting signal is output to the power supply interrupting circuit 103. In response to the power supply interrupting signal input from the abnormality judging section 2012, the power supply interrupting circuit 103 inhibits the power from being supplied to the driving circuit 102. As a result, the PWM driving signal output from the driving circuit 102 is stopped, and the driving of the electric motor 43*a* is stopped.

Moreover, the abnormality judging section 2012 judges in step S204 that the driving circuit 102 is abnormal in accordance with the difference which is the duty comparison result (step S204: NG). Then, the abnormality judging section shifts to step S206, outputs the power supply interrupting signal to the power supply interrupting circuit 103, and allows the power supply interrupting circuit 103 to stop the operation of the driving circuit 102.

Figure 11:
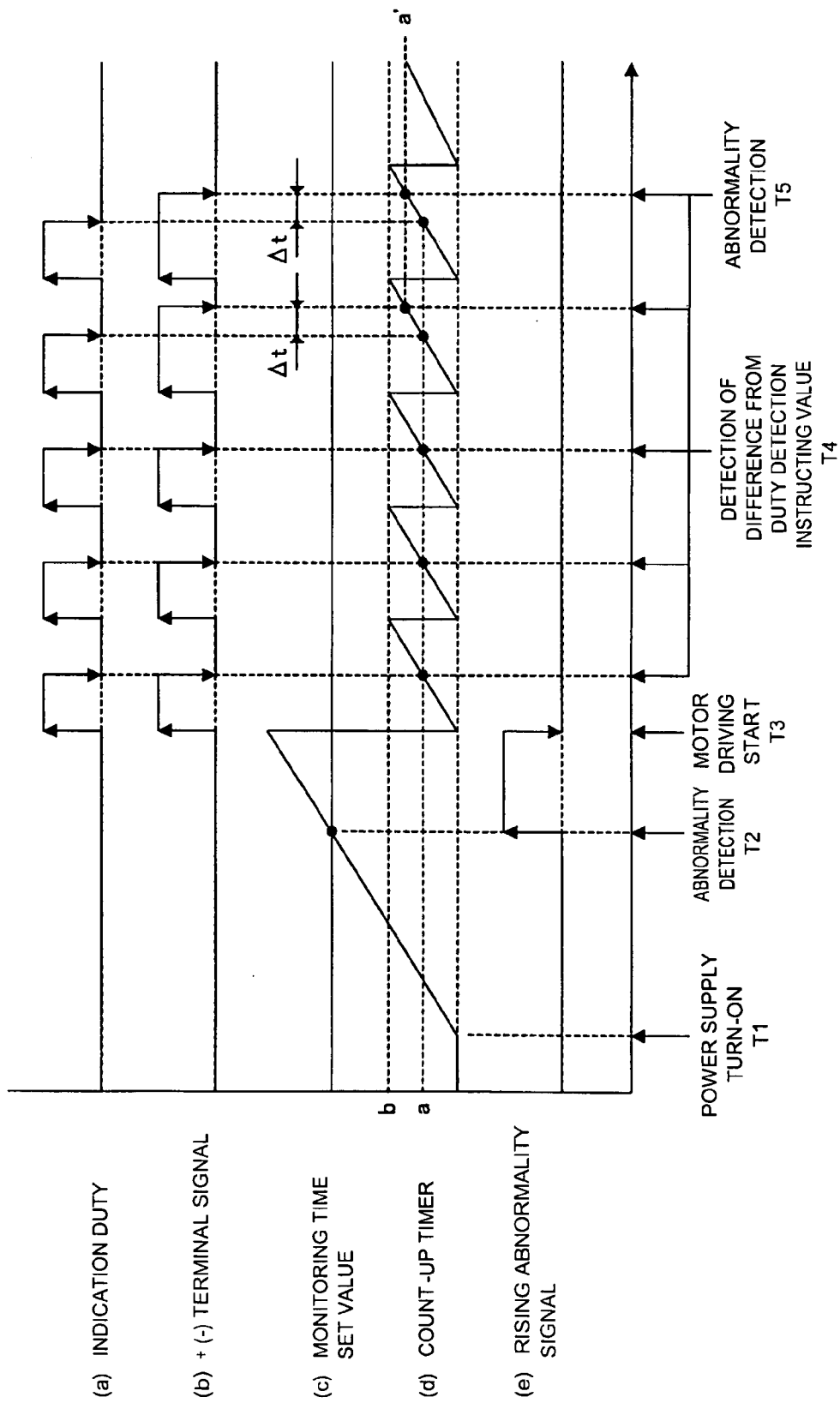
FIG. 11 depicts timing charts in which chart (a) is a timing chart showing an indication duty, chart (b) is a timing chart showing the PWM driving signal of the +(−) terminal, chart (c) is a timing chart showing the monitoring time set value, chart (d) is a timing chart showing the counted value of the count-up timer, and chart (e) is a timing chart showing the rising abnormality signal.

FIG. 11 shows an example of the case where the difference of the duty comparison result is abnormal. In FIG. 11, chart (a) is a timing chart showing an operation of an indication duty by the PWM control signal, chart (b) is a timing chart showing an operation of the +(−) terminal signal, chart (c) is a timing chart showing an operation of the monitoring time set value, chart (d) is a timing chart showing an operation of the counted value of the count-up timer 1013b, and chart (e) is a timing chart showing an operation of the rising abnormality signal.

When the duty value of the PWM driving signal output from the driving circuit 102 deviates from the indication duty as shown in FIG. 11(a), an a/b value indicating a normal duty changes to an a'/b value of a deviating duty as shown by the counted value of the chart (d). Moreover, a difference Δt shown in the figure is detected as a comparison result of the indication duty with the detected duty value. As a result, the abnormality judging section 2012 judges that the operation of the driving circuit 102 is abnormal by the difference Δt which is the duty comparison result input from the comparing section 2011b (abnormality detection T5 in the figure).

As a result, in the abnormality judging section 2012, the power supply interrupting signal is output to the power supply interrupting circuit 103, and the operation of the driving circuit 102 is stopped by the power supply interrupting circuit 103.

As described above, in the motorbike 1 of this second embodiment, the CPU 201 is provided with the terminal monitoring unit 2011 which monitors the PWM driving signal output from the driving circuit 102 for driving the electric motor 43a, and the abnormality judging section 2012 which judges whether or not the driving circuit 102 is abnormal. In the terminal monitoring unit 2011, the edge detecting section 1013a detects the rising edge of each pulse of the PWM driving signal, the count-up timer 1013b counts an edge detection period, and the comparing section 1013d compares the monitoring time set value (e.g., twice the PWM signal period) set by the monitoring time setting section 1013c based on the PWM control signal with the counted value of the count-up timer 1013b. Moreover, when the counted value exceeds the monitoring time set value, the comparing section 1013d outputs the rising abnormality signal ("high" signal) to the abnormality judging section 2012.

In the terminal monitoring unit 2011, the duty detecting section 2011a detects the duty value of the PWM driving signal from the counted value of the timer 1013b at the time of detection of a falling edge, and the comparing section 2011b compares the duty value with the target duty value of the PWM control signal, and outputs the difference as the duty comparison result to the abnormality judging section 2012.

When the rising abnormality signal ("high" signal) is input from the comparing section 1013d, the abnormality judging section 1014 judges that the driving circuit 102 is abnormal, outputs the power supply interrupting signal to the power supply interrupting circuit 103, interrupts the power supply for the driving circuit 102, and stops the operation of the electric motor 43a. The abnormality judging section 2012 judges whether the operation of the driving circuit 102 is normal or abnormal based on the difference of the duty comparison result input from the comparing section 2011b. When it is judged that the operation is abnormal, the power supply interrupting signal is output to the power supply interrupting circuit 103, the power supply for the driving circuit 102 is interrupted, and the operation of the electric motor 43a is stopped.

Therefore, the abnormality of the driving circuit 102 can be judged quickly by both of the edge detection and the duty detection, it is judged that the driving circuit 102 is abnormal before the electric motor 43a abnormally operates, and the operation of the electric motor 43a can be stopped almost instantly. As a result, an abnormal behavior can be prevented from being generated in the motorbike by an abnormal operation of the electric motor 43a, and the operation of the motorbike can be enhanced.

It is to be noted that the detection of the rising edge of the pulse has been described above in this second embodiment, but a falling edge of the pulse may be detected in addition or in the alternative to the detection of the rising edge.

It is to be noted that it has been described above in the respective embodiments that the terminal monitoring unit is constituted as software in the CPU. In this case, since an abnormality monitoring program is constituted as an interrupting program without laying any burden onto a main routine of the CPU, it is possible to execute the abnormality monitoring as an interrupting process in an original engine control process. The present invention is not limited to the embodiments, and the terminal monitoring unit may be constituted, for example, by peripheral hardware.

In the above-described abnormality monitoring devices for the motor control system, the pulse of the PWM driving signal output from the driving section is monitored to judge whether or not the driving section is abnormal. It thus is possible to judge that the driving section is abnormal before the motor abnormally operates. Additionally, by monitoring the output of the driving circuit, the device can detect for malfunction or the introduction of errors occurring within the driving circuit in addition to those occurring within the CPU.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In particular, while the present motor control system has been described in the context of particularly preferred embodiments, the skilled artisan will appreciate, in view of the present disclosure, that certain advantages, features and aspects of the motor control system may be realized in a variety of other applications, many of which have been noted above. Additionally, it is contemplated that various aspects and features of the invention described can be practiced separately, combined together, or substituted for one another, and that a variety of combination and sub-combinations of the features and aspects can be made and still fall within the scope of the invention. Thus, it is intended that the scope of the present invention herein disclosed should not be limited by the particular disclosed embodiments described above, but should be determined only by a fair reading of the claims.

What is claimed is:

1. An abnormality monitoring device for an motor control system, comprising:
   a control section configured to generate a PWM control signal to control a motor;
   a driving section configured to generate a PWM driving signal based on the PWM control signal to drive the motor;
   a counting section configured to count pulse periods of the PWM driving signal output from the driving section;
   a monitoring time setting section which sets a monitoring time period to monitor the PWM control signal; and an abnormality judging section configured to determine whether the driving section is functioning abnormally based on the PWM control signal, a counting result produced by the counting section, and the monitoring time period.

2. An abnormality monitoring device for a motor control system, comprising:
a control section which generates a PWM control signal to control a motor;
a driving section which generates a PWM driving signal based on the PWM control signal to drive the motor;
an edge detecting section which detects at least one edge of each pulse of the PWM driving signal output from the driving section;
a counting section which counts an edge period of the detected edge of each pulse detected by the edge detecting section;
a monitoring time setting section which sets a monitoring time to monitor the edge period based on the PWM control signal;
an edge period comparing section which compares the edge period counted by the counting section with the monitoring time set by the monitoring time setting section; and
an abnormality judging section which judges whether or not the driving section is abnormal based on a comparison result of the comparing section.

3. The abnormality monitoring device for the motor control system according to claim 2, wherein the monitoring time setting section sets the monitoring time to be not less than the PWM period set in accordance with the PWM control signal.

4. The abnormality monitoring device for the motor control system according to claim 2, wherein the control section sets a control range of the target duty value to be greater than 0% and be less than 100%, and the abnormality judging section judges that the driving section is abnormal when the edge is not detected by the edge detecting section and the counting result of the counting section exceeds the monitoring time input from the monitoring time setting section.

5. The abnormality monitoring device for the motor control system according to claim 2, wherein the control section sets a control range of the target duty value to 0% or more and 100% or less, and the abnormality judging section judges that driving section is abnormal when edge is not detected by the edge detecting section and the counting result of the counting section exceeds the monitoring time, in a case where the target duty value is 0% or 100%.

6. The abnormality monitoring device for the motor control system according to claim 2, wherein the abnormality judging section outputs an abnormality signal to the control section when judging that the driving section is abnormal, and the control section detects the abnormality of the driving section based on the abnormality signal output from the abnormality judging section.

7. The abnormality monitoring device for the motor control system according to claim 2, wherein prior to start of the PWM control of the motor by the control section, the abnormality judging section judges whether operations of the edge period comparing section, the edge detecting section, the monitoring time setting section, and the counting section are normal or abnormal based on whether or not the counting result of the counting section exceeds the monitoring time in a case where an edge is not detected by the edge detecting section.

8. An abnormality monitoring device for a motor control system, comprising:
a control section which generates a PWM control signal to PWM-control a motor;
a driving section which generates a PWM driving signal based on the PWM control signal to drive the motor;
an edge detecting section which detects a rising (or falling) edge of each pulse of the PWM driving signal output from the driving section;
a counting section which counts an edge period of the rising (or falling) edge of each pulse detected by the edge detecting section;
a monitoring time setting section which sets a monitoring time to monitor the edge period based on the PWM control signal;
an edge period comparing section which compares the edge period counted by the counting section with the monitoring time set by the monitoring time setting section;
a duty detecting section which detects a duty value of the PWM driving signal based on the edge period counted by the counting section;
a duty comparing section which compares the duty value detected by the duty detecting section with a target duty value set in accordance with the PWM control signal; and
an abnormality judging section which judges whether or not the driving section is abnormal based on comparison results of the edge period comparing section and the duty comparing section.

9. The abnormality monitoring device for the motor control system according to claim 8, wherein the monitoring time setting section sets the monitoring time to be not less than the PWM period set in accordance with the PWM control signal.

10. The abnormality monitoring device for the motor control system according to claim 8, wherein the control section sets a control range of the target duty value to be greater than 0% and be less than 100%, and the abnormality judging section judges that the driving section is abnormal when the edge is not detected by the edge detecting section and the counting result of the counting section exceeds the monitoring time input from the monitoring time setting section.

11. The abnormality monitoring device for the motor control system according to claim 8, wherein the control section sets a control range of the target duty value to 0% or more and 100% or less, and the abnormality judging section judges that driving section is abnormal when edge is not detected by the edge detecting section and the counting result of the counting section exceeds the monitoring time, in a case where the target duty value is 0% or 100%.

12. The abnormality monitoring device for the motor control system according to claim 8, wherein the abnormality judging section judges that the driving section is abnormal in a case where there is a difference which is not less than a certain value between the detected duty value and the target duty value.

13. The abnormality monitoring device for the motor control system according to claim 8, wherein the abnormality judging section outputs an abnormality signal to the control section when judging that the driving section is abnormal, and the control section detects the abnormality of the driving section based on the abnormality signal output from the abnormality judging section.

14. The abnormality monitoring device for the motor control system according to claim 8, wherein prior to start of the PWM control of the motor by the control section, the abnormality judging section judges whether operations of the edge period comparing section, the edge detecting section, the monitoring time setting section, and the counting section are normal or abnormal based on whether or not the counting result of the counting section exceeds the monitoring time in a case where an edge is not detected by the edge detecting section.

15. An abnormality monitoring program for a motor control system that includes a control section which generates a PWM control signal to control a motor and a driving section which generates a PWM driving signal based on the PWM control signal to drive the motor, the program comprising the steps of:

detecting an edge of each pulse of the PWM driving signal;
  counting an edge period of the edge of each detected pulse;
  setting a monitoring time to monitor the edge period based on the PWM control signal;
  comparing the counted edge period with the set monitoring time; and
  judging an abnormality of the driving section based on the comparison result.

16. An abnormality monitoring program for a motor control system that includes a control section which generates a PWM control signal to control a motor and a driving section which generates a PWM driving signal based on the PWM control signal to drive the motor, the program comprising the steps of:

detecting a rising or falling edge of each pulse of the PWM driving signal;
  counting an edge period of the rising or falling edge of each detected pulse;
  a monitoring time setting step of setting a monitoring time to monitor the edge period based on the PWM control signal;
  comparing the counted edge period with the set monitoring time;
  a duty value of each pulse based on the counted edge period;
  comparing the detected duty value with a target duty value set in accordance with the PWM control signal; and
  judging whether or not the driving section is abnormally operating based on comparison results of time and duty value.

* * * * *